United States Patent [19]

Savage

[11] 4,049,072
[45] Sept. 20, 1977

[54] MODULAR VEHICLE SUBASSEMBLY

[75] Inventor: Donald D. Savage, Huntsville, Ala.

[73] Assignee: B. J. Powell, Atlanta, Ga.

[21] Appl. No.: 616,028

[22] Filed: Sept. 23, 1975

Related U.S. Application Data

[62] Division of Ser. No. 439,736, Feb. 5, 1974, Pat. No. 3,907,053.

[51] Int. Cl.² .............................................. B60K 5/10
[52] U.S. Cl. .............................. 180/64 M; 180/66 R; 280/5 A
[58] Field of Search ........... 180/64 M, 64 MM, 64 A, 180/64 R, 66 R, 54 R, 68.5; 280/5 A, 5 F

[56] References Cited

U.S. PATENT DOCUMENTS

| | | | |
|---|---|---|---|
| 695,541 | 3/1902 | Creanche | 180/64 R |
| 1,011,664 | 12/1911 | Sundh | 180/66 R |
| 1,165,784 | 12/1915 | Klingelsmith | 180/68.5 |
| 2,394,160 | 2/1946 | Emmitt | 180/66 R |
| 2,748,879 | 6/1956 | Bailey | 180/66 R |
| 2,764,449 | 9/1956 | Dunham | 280/5 A |
| 2,833,362 | 5/1958 | Martin | 180/66 R |
| 3,285,359 | 11/1966 | Weeks et al. | 280/5 A |
| 3,850,473 | 11/1974 | Huber | 280/5 A |
| 3,858,675 | 1/1975 | Geis | 180/66 R |

FOREIGN PATENT DOCUMENTS

2,310,158   3/1973   Germany ..................... 180/64 M

*Primary Examiner*—Philip Goodman
*Assistant Examiner*—David M. Mitchell
*Attorney, Agent, or Firm*—B. J. Powell

[57] ABSTRACT

A vehicle base subassembly with a base frame comprising a pair of spaced apart side rails joined by spaced apart torque tubes with the torque tubes centered about the drive axes of the subassembly. A prime mover module is slidably mounted in the base frame with an internal combustion engine driving a pair of hydraulic pumps. A hydraulic drive motor is carried by opposite ends of each of the torque tubes with the motors on one side of the subassembly operated in tandum and independently from the motors on the other side. A wheel and tire assembly is carried by each drive motor and the output of the hydraulic pumps is controlled to operate the subassembly according to the skid-steer principle. A mounting platform for accessory equipment is provided on the base subassembly to accept different pieces of accessory equipment.

2 Claims, 8 Drawing Figures

MODULAR VEHICLE SUBASSEMBLY

CROSS-REFERENCE TO RELATED APPLICATIONS

This application is a division of my co-pending application Ser. No. 439,736, filed Feb. 5, 1974, now Pat. No. 3,907,053.

BACKGROUND OF THE INVENTION

Vehicles which use a base subassembly having independently driven wheels on opposite sides thereof are available on the market today. This general type of steering system is commonly known as the "skid steer" principle. Because such vehicles use an independent axle at each wheel on the opposite sides of the vehicle, large amounts of torque are generated within the frame of the base subassembly. The prior art base subassemblies have generally used a torque tube displaced from the rotational axis of the wheels in an attempt to compensate for the torque applied as the vehicle is operated. This has created problems in that a majority of the torque was applied directly to the frame of the base subassembly without being transmitted to the torque tube. Another problem with these prior art base subassemblies is that the lack of accessibility to the components, especially the prime mover, in the base subassembly for maintenance and repair. This has required considerable down time while the subassembly was disassembled to reach the damaged component to repair same. Most of the prior art base subassemblies were designed for a single use so that if an attempt was made to mount different types of accessory equipement thereon as is frequently required in the economical operation of such equipment, this accessory equipment could not easily be mounted on the base subassembly without considerable remanufacture of the subassembly and/or, even if such equipment could be mounted, it could not be used without damage to the base subassembly.

SUMMARY OF THE INVENTION

These and other problems and disadvantages associated with the prior art are overcome by the invention disclosed herein in that a vehicle subassembly is provided which is capable of compensating for the torque applied to the subassembly even though separate drive shafts are used at each wheel, which has all of the components of the subassembly easily accessible for maintenance and repair, onto which various accessory equipment can be mounted easily and which requires only one of the operator's hands to control the operation of the subassembly thereby freeing the other hand for use in controlling the accessory equipment. The controls for the subassembly may be located at any position on the subassembly and are movable so that the operator's position can be easily relocated to effectively operate any accessory equipment. The hydraulic system provides limited slip driving capability to the wheels so that the assembly still has driving power even though some of the sheels may temporarily lose traction.

The apparatus of the invention comprises generally a base frame including a pair of spaced apart side rails joined by a pair of spaced apart torque tubes oriented along axes which coincide with the rotational axis of each of the wheels. A mounting assembly is connected to opposite ends of each of the torque tubes as well as to the side rail at the end of the torque tube for mounting the drive motor for each of the wheels. A ground engaging wheel and tire assembly is mounted on each of the drive motors so that the wheel and tire assembly rotates about the axis of its associated torque tube. A prime mover module including an internal combustion engine with hydraulic pumps mounted thereon is removably carried in the base frame between the spaced apart side rails and operatively connected to each of the drive motors to drive the subassembly according to the skid steer principle. The entire prime mover module can be slidably removed from between the side rails of the base frame for servicing. A carriage superstructure is provided on the base frame for mounting various accessory equipment thereon.

These and other features and advantages of the invention will become more clearly understood upon consideration of the following specification and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the figures, it will be seen that the invention is a vehicle subassembly 10 which supports the vehicle and provide the operational power to the vehicle. The vehicle subassembly 10 includes generally a base frame 11, a prime mover module 12 removably mounted in the base frame 11, a plurality of drive means 15 carried by the base frame 11 and a wheel and tire assembly 16 carried by each drive means 15. The prime mover module 12 operates the drive means 15 so as to selectively drive the wheel and tire assemblies 16 to propel the vehicle subassembly 10.

BASE FRAME

Figure 1:
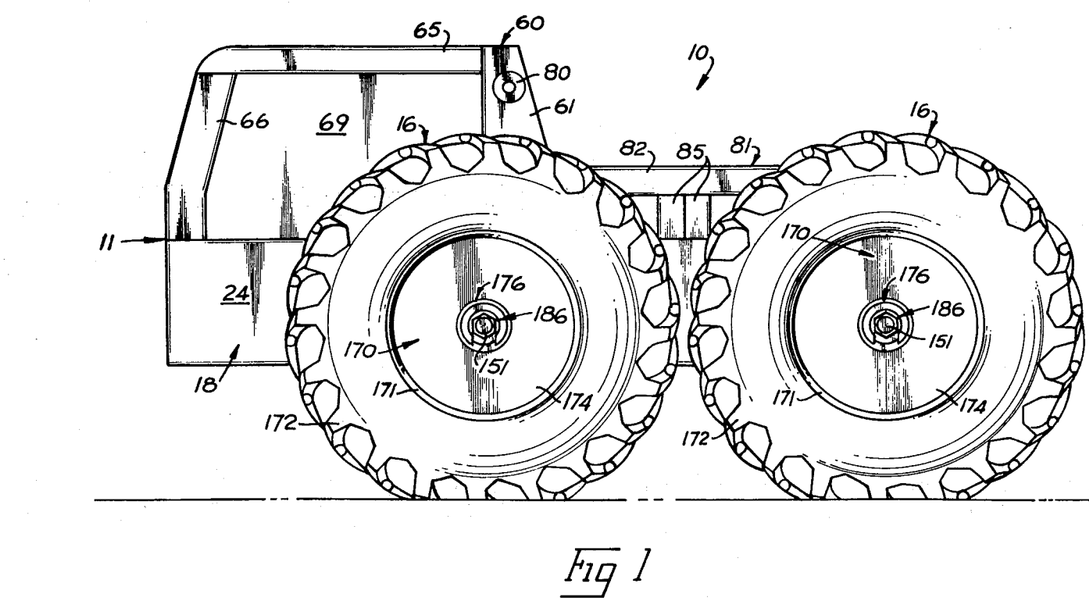
FIG. 1 is a side elevational view of a base subassembly embodying the invention.

The base frame 11 as best seen in FIGS. 1-5 includes a pair of spaced apart side rails 18 joined by a pair of spaced apart torque tubes 19. Each of the side rails 18 is tubular with a generally rectangular cross-sectional shape defined by a top wall 20, bottom wall 21, inside wall 22 and outside wall 24. The side rails 18 are positioned by the torque tubes 19 so that their longitudinal centerlines are generally parallel to the longitudinal centerline CL of the vehicle subassembly 10. For sake of simplicity, the left end of subassembly 10 as seen in FIG. 1 will be called the front end, it being understood that either end may be used as the front end in operation.

Figure 2:
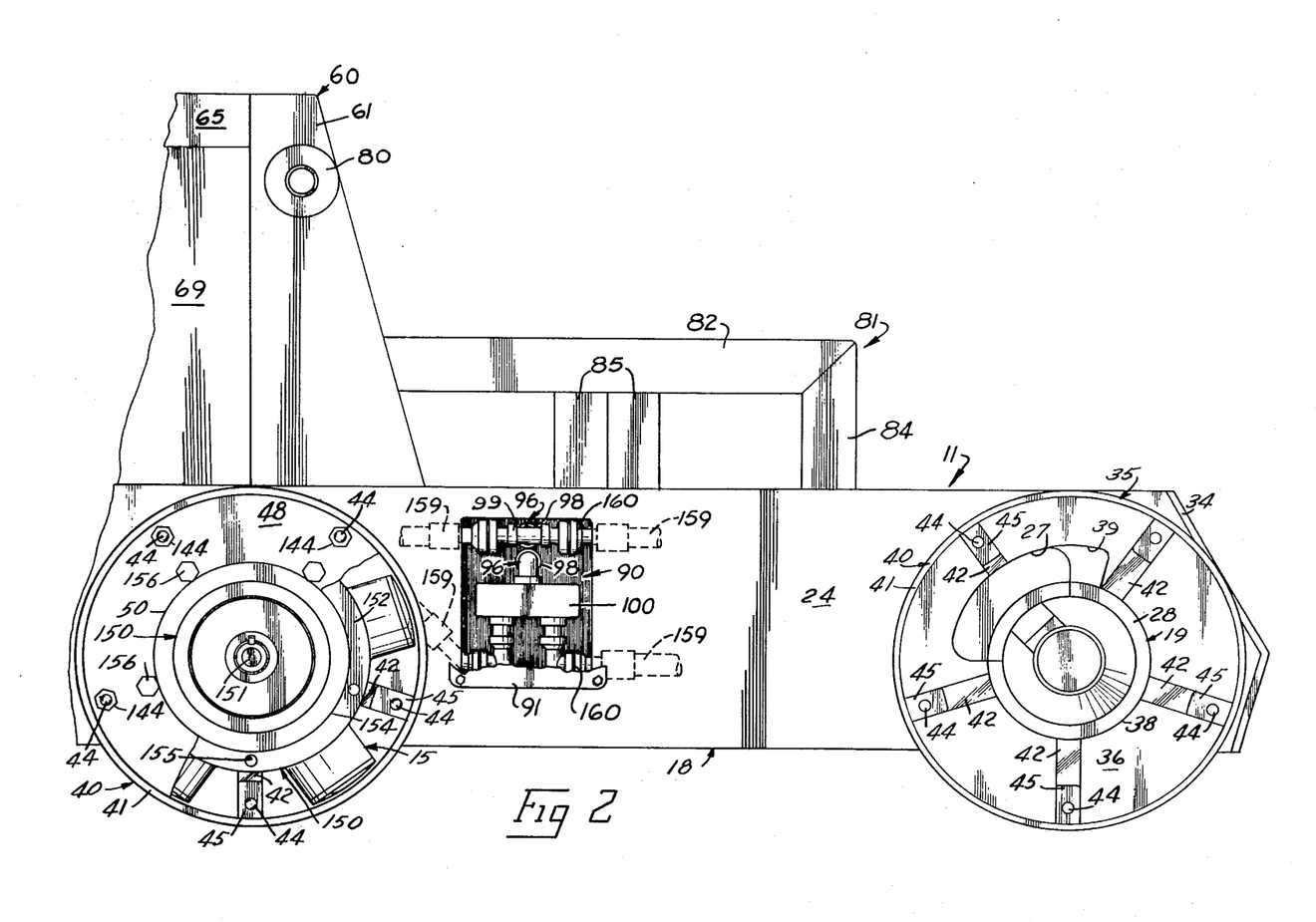
FIG. 2 is a side elevational view similar to FIG. 1 with some of the wheel and tire assemblies as well as the drive motors removed.
Figure 5:
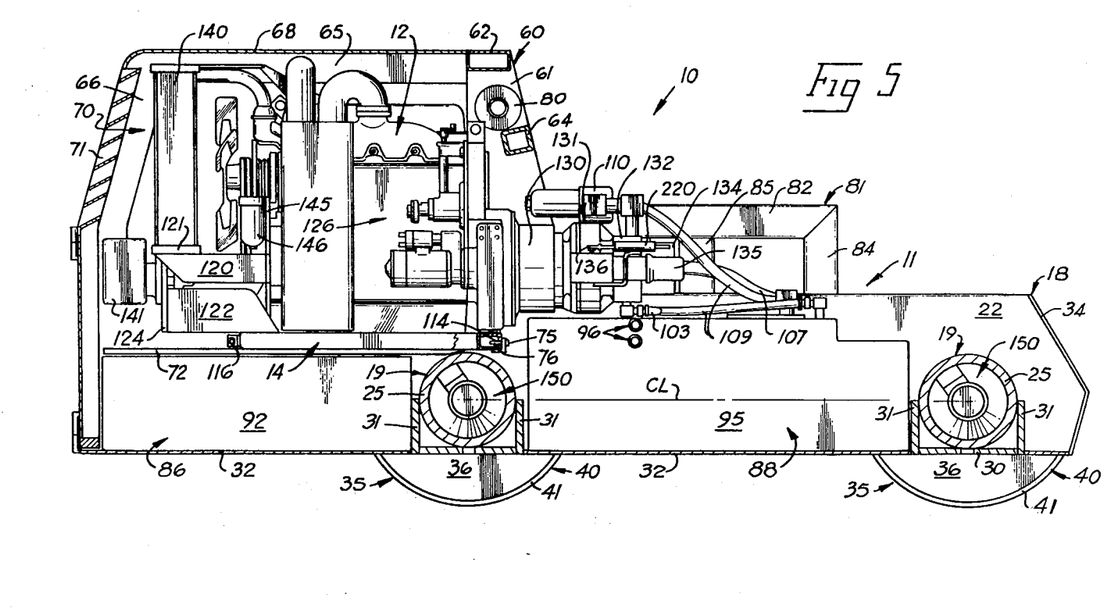
FIG. 5 is a longitudinal cross-sectional view of the subassembly taken along lines 5—5 in FIGS. 3 and 4.
Figure 6:
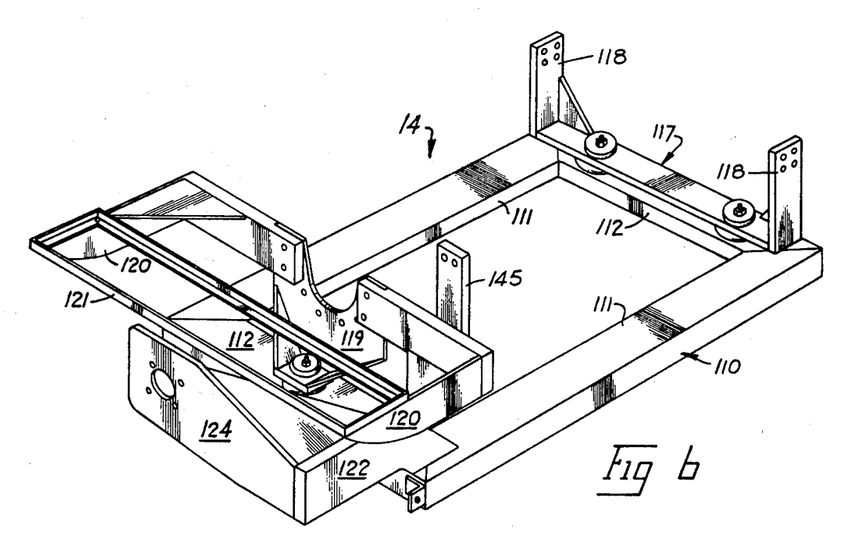
FIG. 6 is a perspective view of the undercarriage for the prime mover module.

The torque tubes 19 are tubular with an annular side wall 25 and are arranged so that the centerline of each of the tubes 19 coincides with the drive axis $A_D$ of the vehicle subassembly 10 as will become more apparent. It will also be noted that the centerline of each of the torque tubes 19 is arranged substantially normal to the longitudinal centerline CL of the vehicle subassembly 10. Each torque tube 19 extends through aligned openings 26 in both the inside and outside walls 22 and 24 and are affixed to both the inside and outside walls 22 and 24 by conventional means such as welding. The outside ends 28 of the torque tubes 19 project slightly beyond the outside walls 24 of the side rails 18 as will become more apparent. An arcuate access cutout 27 is formed in the outside wall 24 as seen in FIG. 2 of the side rails 18 at its juncture with the outside ends 28 of the torque tubes 19 and also in the ends 28 of the torque tubes 19 as will become more apparent. A reinforcing plate 30 as seen in FIG. 5 extends between the inside walls 22 of the side rails 18 immediately under each of the torque tubes 19 which is welded to the walls 22 of the side rails 18 at opposite ends thereof and plug welded to the side wall 25 of the torque tubes 19. Side braces 31 extend between the inside walls 22 of the side rails 18 on opposite sides of each of the torque tubes 19 and are welded to both the side wall 25 of each torque tube 19, the inside walls 22 of the side rails 18 and to the reinforcing plate 30 along opposite edges thereof. Bottom pans 32 serve to close the bottom of the base frame 11 between the inside walls 22 of the side rails 18 and the reinforcing plate 30. Each of the side rails 18 is closed at opposite ends thereof by end plates 34 which join the walls 20, 21, 22 and 24.

Figure 3:
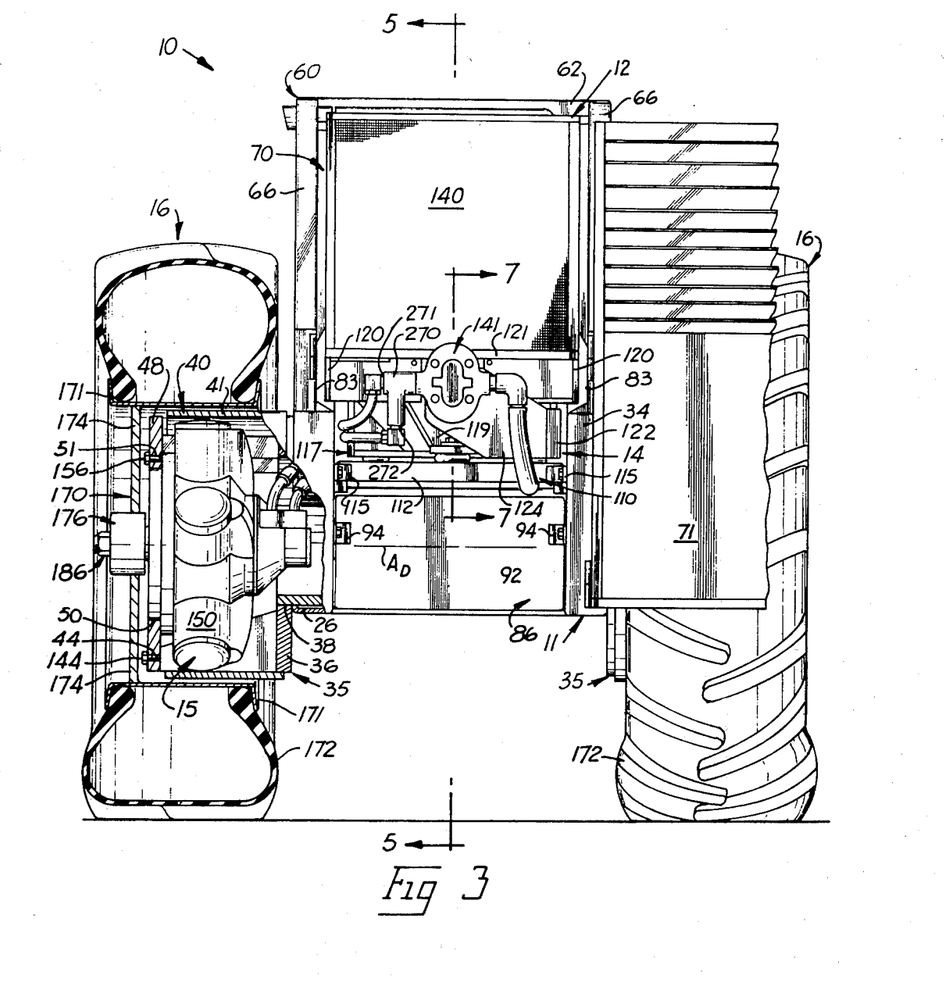
FIG. 3 is an end elevational view from the prime mover end of the subassembly.

A mounting unit 35 as seen in FIGS. 2 and 3 is carried on the projecting ends 28 of each of the torque tubes 19 adjacent the outside wall 24 of the side rails 18. The mounting unit 35 serves to mount the drive means 15 therein as will become more apparent. Each mounting unit 35 includes an annular transfer disc 36 defining an inside opening 38 to receive the projecting end 28 of the torque tube 19 therein and is attached to the projecting end 28 of the torque tube 19 by welding. An access opening 39 is provided in the transfer disc 36 adjacent the inside opening 38 in registration with the access cutout 27 in the side rail 18 as will become more apparent. Each of the transfer disks 36 is also welded to the outside wall 24 of the side rails 18 so as to fixedly attach the disc 36 to both the torque tube 19 and the side rail 18. It will be noted that the transfer disc is tangent to the top wall 20 of the side rail 18 and projects below the bottom wall 21 of the side rail 18. A spacer ring 40 having an annular side wall 41 with an inside diameter substantially equal to the outside diameter of the transfer disc 36 is welded to the outer peripheral edge of the transfer disc 36 and extends outwardly therefrom concentrically about the drive axis $A_D$. A plurality of inwardly projecting support blocks 42 are attached to the inside of side wall 41 and circumferentially spaced thereabout and also attached to the transfer disc 36. An outwardly extending threaded stud 44 is provided on the outer face 45 of each of the blocks 42. The faces 45 of the blocks 42 lie in a plane substantially normal to the drive axis $A_D$ and spaced just outwardly of the outer edge 46 of the spacer ring 40. A disc-shaped motor mount 48 having a diameter substantially equal to the diameter of the transfer disc 36 is positioned on the threaded studs 44 through lug holes 49 through the motor mount 48. The lug holes 49 are arranged so that the motor mount 48 is concentrically located with respect to the drive axis $A_D$ and a drive axle opening 50 is centrally located in the motor mount 48 as will become more apparent. A second inner series of motor mount holes 51 are provided about the opening 50 to mount the drive means 15 on the motor mount 48 as will become more apparent.

A superstructure 60 as seen in FIGS. 1-5 is mounted on the top wall 20 of the side rails 18 and extends upwardly therefrom. The superstructure 60 serves to protect the prime mover module 12 and as a mounting platform for accessory equipment. The superstructure 60 includes a pair of primary upright stanchions 61 extending upwardly from the side rails 18 just forwardly of the vertical plane of the drive axis AD shown on the left in FIG. 5. An upper cross brace 62 connects the upper ends of the stanchions 61 and an intermediate cross brace 64 connects the upright stanchions 61 a prescribed distance below the upper ends thereof. A pair of upper cowling frame members 65 extend forwardly from the upper ends of the support stanchion 61 over each of the side rails 18 and generally parallel thereto as seen in FIGS. 1 and 5. The front end of each of the frame members 65 is connected to the front end of the side rail 18 through a depending angular brace 66. An upper cover plate 68 extends between the frame members 65 and side cover plates 69 cover each of the openings formed between each stanchion 61, frame member 65, brace 66 and side rail 18. This forms a forwardly opening enclosure 70 in which the prime mover package 12 is received as will be more fully explained. The front end of the enclosure 70 is selectively closed by a louvered door 71 hinged to the side rails 18 and braces 66.

A pair of inwardly projecting slide rails 72 as seen in FIG. 5 are provided on the inside wall 22 of the side rails 18 in enclosure 70 intermediate their height which slidably mounts the prime mover module 12 thereon as will become more apparent. The plane of the upper slide surface 74 of each of the slide rails 72 is generally parallel to the top wall 20 of the side rail 18 and located just above the upper edge of the front torque tube 19. An angular abutment 75 is provided just rearwardly of the front torque tube 19 and includes a rearwardly extending locating pin 76 which engages the prime mover module 12 to locate same as will become more apparent.

Figure 4:
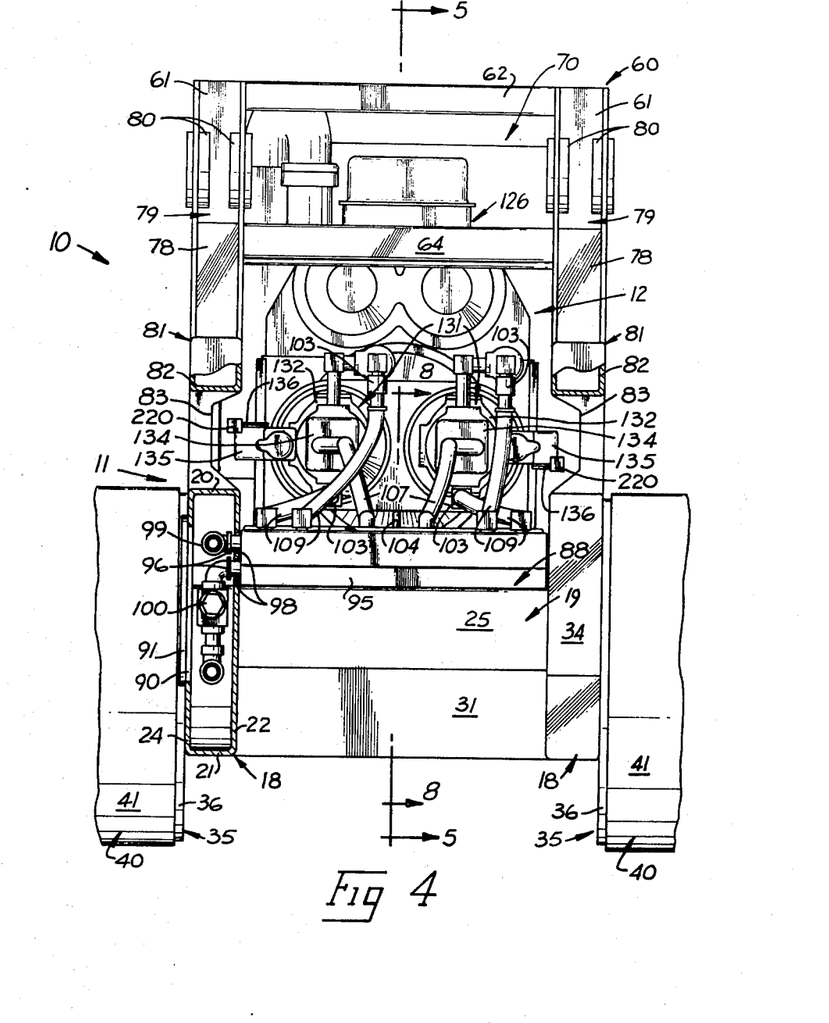
FIG. 4 is an end elevational view of the opposite end of the subassembly.

Each of the primary upright stanchions 61 has a U-shaped cross section with the open rear side thereof closed by a reinforcing plate 78 as seen in FIG. 4 for a prescribed distance from the side rail 18 and then curves rearwardly between the sides of the stanchions 61 to form an arm receiving pivot pocket 79. A pair of aligned journals 80 are provided through the sides of the stanchions 61 with aligned passages therethrough to pivotally mount accessory equipment thereon. The inside lower ends of stanchions 61 are recessed at 83 as best seen in FIG. 4 to provide sufficient clearance for the prime mover module 12 to be removed forwardly from enclosure 70 when the door 71 is opened as best seen in FIG. 3.

A pair of accessory mounting pads 81 extend rearwardly from the stanchions 61. The mounting pads 81 each include an upper support rail 82 supported at its rear end by a standard 84 and intermediate its ends by standards 85. The mounting pads 81 also serve as side protectors for the prime mover module 12 as will become more apparent.

A cutout 90 as seen in FIG. 2 is provided through each of the outside walls 24 of the side rails 18 intermediate the torque tubes 19 and is selectively closed by an access plate 91. The purpose of these cutouts 90 will be more fully disclosed hereinafter.

It will be noted that one of the torque tubes 19 is positioned at one end of side rails 18 while the other torque tube 19 is positioned intermediate the length of the side rails 18 at a point spaced from the rear torque tube a distance of approximately 4/7 of the length of side rails 18. Thus, the bottom engine enclosure 70 lies in a plane tangent to the uppermost point on torque tubes 19. This also defines a first tank space 86 between side rails 18, enclosure 70, bottom pan 32 and the front torque tube 19 at the front end of subassembly 10 and a second tank space 88 between the torque tubes 19, side rails 18 and bottom pan 32 as will become more apparent.

PRIME MOVER MODULE

The prime mover module 12 is designed to be removably received into the enclosure 70 in frame 11 on the slide rails 72. This greatly facilitates the servicing and repair of the module 12 since it contains the components requiring frequent maintenance and more likely to need repair. The module 12 furnishes the power to drive both the subassembly 10 and accessory equipment carried thereby.

The module 12 as seen in FIGS. 3-7 includes an undercarriage 14, an internal combustion engine 126 mounted on the undercarriage 14, a pair of primary hydraulic pump assemblies 131 drivingly connected to engine 126 through a transfer case 130 on the rear end of the engine, and an auxiliary hydraulic pump 141 drivingly connected to the front end of the engine. The entire module 12 is supported through the undercarriage 14. The engine 126 illustrated is a conventional diesel engine and the transfer case 130 is a conventional one input, dual output unit with the case 130 shwon available from Hydreco. The primary pump assemblies 131 are conventional variable piston pump assemblies such as the Hydreco Phase IV Standard Variable Pump illustrated. The pump assemblies 131 have an integral main pump 132 with an integral charge pump 134 that supplies fluid to the main pump 132. The main pump 132 has a variable and reversible output controlled by control lever 136 through an integral booster pump 135 as is known in the art. The auxiliary pump 141 is a conventional fixed displacement pump also illustrated as a standard Hydreco pump.

Figure 7:
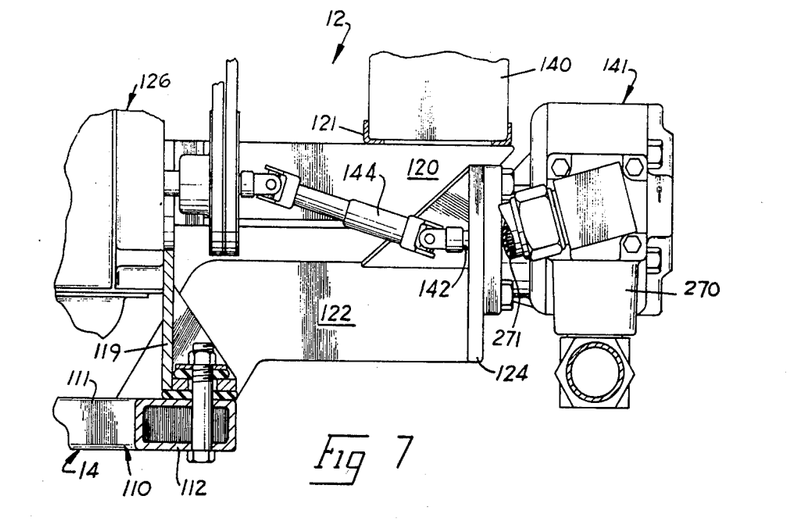
FIG. 7 is a partial enlarged cross-sectional view taken along line 7—7 in FIG. 3.

The undercarriage 14 includes generally an open rectangular frame 110 comprising a pair of side rails 111 joined by end rails 112. That end rail 112 facing the abutment 75 is provided with a pair of locating apertures 114 as seen in FIG. 5 through which the locating pin 76 is slidably received as the frame 110 is moved toward the abutment 75 and the front end rail 112 is provided with a pair of flanges 115 which may be removably pinned to the inside walls 22 of the side rails 18 through pins 116 to lock the frame 110 in position on the slide rails 72. That end of the rectangular frame 110 facing the abutment 75 is provided with a U-shaped rear engine mount 117 with a pair of upstanding mounting legs 118 which resiliently mount one end of the engine 126 as will become more apparent. The front end of the rectangular frame 110 opposite the abutment 75 is provided with an upstanding central motor mount 119 which mounts the front end of the engine 126 as will become more apparent. A pair of side support brackets 120 extend forwardly from opposite sides of the central motor mount 119 to mount a radiator support 121 thereon spaced forwardly of the central motor mount 119 and behind the door 71. A forwardly extending support plate 122 is mounted on one side of the front end rail 112 and extends forwardly and upwardly therefrom to join with an auxiliary pump bracket 124 extending inwardly across the front end of the enclosure 70 behind door 71 to mount the auxiliary pump 141 thereon. Since the engine 126 carries the transfer case 130 and the case 130 carries the pump assemblies 131, it will be seen that the entire module 12 is supported on undercarriage 14. A conventional radiator 140 is mounted in the radiator support 121 so that the radiator 140 is resiliently mounted with engine 126. An upstanding bracket 145 on bracket 120 as seen in FIG. 5 mounts the engine oil filter 146. The auxiliary pump bracket 124 laterally centers the pump 141 with respect to the engine 126 and the input shaft 142 of the auxiliary pump 141 is drivingly connected to the front end of the drive shaft of engine 126 through a universally connected drive shaft 144 as seen in FIG. 7.

Figure 8:
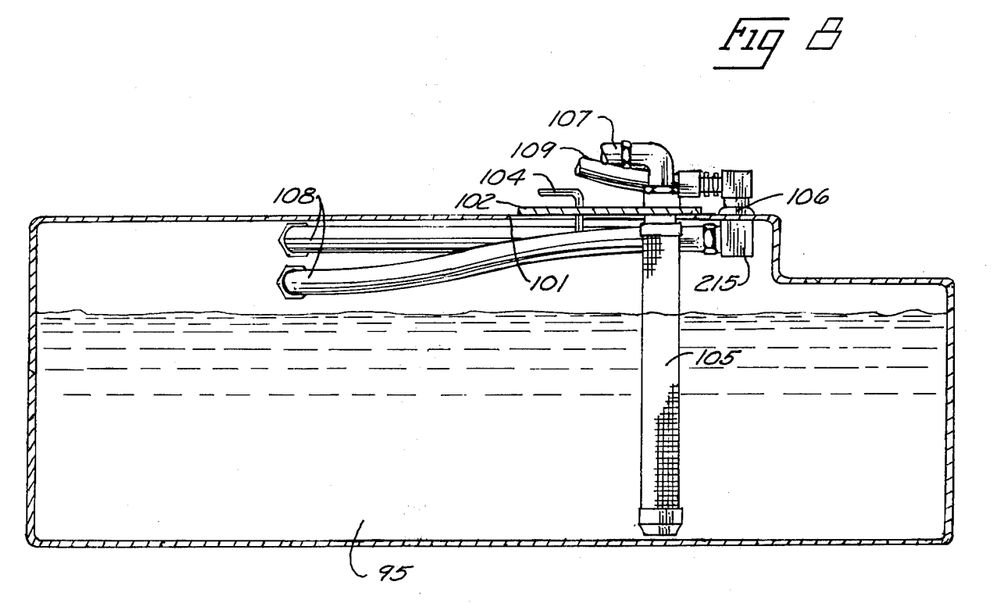
FIG. 8 is a cross-sectional view of the hydraulic fluid tank taken along line 8—8 in FIG. 4.

A fuel tank 92 as seen in FIGS. 3 and 5 with a generally rectangular cross-section is slidably received on the bottom pan 32 at the front end of the subassembly 10. The fuel tank 92 has a height less than the distance from the top of the bottom pan 32 to the slide rails 72. A pair of holding tabs 94 hold the tank 92 in position. A hydraulic fluid tank 95 as seen in FIGS. 4, 5 and 8 is carried on the bottom pan 32 between the torque tubes 19 in space 88. The tank 95 has a generally rectangular cross section so that the side walls of the tank 95 lie in juxtaposition with the inside walls 22 of the side rails 18. The female portions of a pair of quick-disconnect couplings 96 are provided in each of the walls of the hydraulic fluid tank 95 as seen in FIG. 5 in juxtaposition with the inside walls 22 of the side rails 18 at each of the cutouts 90. An access port 98 as seen in FIG. 2 is provided through the inside wall 22 of the side rail 18 in alignment with each female portion of the quick-disconnect couplings 96 so that the male portions of couplings 96 can pass through the ports 98 and engage the female portions of the couplings 96. A T-fitting 99 is connected to the upper coupling 96 and housed in the cutout 90 while conventional 50/50 divider/combiner valve 100 is connected to the lower coupling 96 and housed within the cutout 90. In this manner, it will be seen that the hydraulic tank 95 can be removed from between the side rails 18 by releasing the quick-disconnect couplings 96 and then lifting the tank 95 from between the side rails 18.

An opening 101 as seen in FIG. 8 is provided in the top of the tank 95 which is releasably covered by a mounting cover plate 102. A quick release mechanism 104 is provided in the cover plate 102 which engages the tank 95. A pair of intake filters 105 are mounted from the bottom of the cover plate 102 and extend into the tank 95. The intake filters 105 are connected to the intake port of the charge pumps 134 of the primary pump assemblies 131 by hoses 107. Thus, the filters 105 can be easily changed by operating the mechanism 104 to release cover plate 102 and lifting it from tank 95. This also lifts the filters from tank 95 since they are attached to plate 102.

The female portions of the couplings 96 are connected individually to transfer ports 106 in the top of tank 95 by transfer pipes 108 within tank 95 as seen in FIG. 8. Hoses 109 with quick-disconnect couplings 103 connect ports 106 with the ports on the main pumps 132 of pump assemblies 131. Filters 110 are connected to the pumps 132 and are arranged horizontally so that the filters 110 will pass under brace 64 in order that the module 12 can be removed without removal of filters 110.

It will also be noted that the booster pumps 135 project outwardly from the pump assemblies 131 but the recesses 83 in stanchions 61 as seen in FIG. 4 allow the pumps 135 to pass thereby. Thus, the module can be removed from the frame 11 simply by disconnecting hoses 107 and 109.

DRIVE MEANS

Each drive means 15 is a hydraulic drive motor 150, one drive means 15 being mounted in each of the mounting units 35 as seen in FIGS. 2 and 3. The drive motors 150 are conventional fixed displacement piston motors and provided with a single output drive shaft 151 centrally extending through a mounting flange 152. The drive motors 150 also have a circular support shoulder 154 adjacent the mounting flange 152 with the drive axle opening 50 in the motor mount 48 being sized to just receive the support shoulder 154 therethrough with the mounting flange 152 lying behind the motor mount 48 about the opening 50. Threaded holes 155 are provided through the mounting flange 152 which are selectively registrable with the motor mount holes 51 in the motor mount 48 so that support bolts 156 received through the motor mount holes 51 threadedly engage the holes 155 to attach the motor 150 to the inside of the motor mount 48. The hydraulic ports 158 as seen in FIG. 3 to the motor 50 are located within the access openings 27 and 39 and connected to one of the pump assemblies 131 through flexible hoses 159 with quick-disconnect fittings 160 as will become more apparent. Thus, it will be seen that each hydraulic motor 150 is mounted on the motor mount 48 with the drive shaft 151 projecting through the opening 50 therein so that the drive shaft 151 rotates about the drive axis $A_D$ extending through the torque tubes 19. The drive shaft 151 is provided with a threaded end 161 to mount the wheel and tire assembly 16 as will become more apparent. Also, it will be noted that shaft 151 is provided with a tapered support section 164 to support the wheel and tire assembly 16 thereon and a key 162 is provided at section 164 to drivingly connect the wheel and tire assembly 16 to the shaft 151 as seen in FIG. 2.

One of the hoses 159 to each of the motors 150 on each side rail 18 passes inside the rail 18 and is connected to the T-fitting 99 through its quick-disconnect fitting 160 and the other of the hoses 159 to each of the motors 150 on each side rail 18 passes inside the rail 18 and is connected to the combiner/divider valve 100 through its quick-disconnect fitting 160. This allows the motors 150 to be easily disconnected at the fittings 160 to facilitate removal of the motors.

The motors 150 are attached to the motor mounts 48 and then the motor mount 48 attached to the blocks 42 by lug nuts 144 engaging the studs 44 as seen in FIG. 3. This also facilitates removal of motors 150 since they can be supported through the motor mounts 48.

WHEEL AND TIRE ASSEMBLY

A wheel and tire assembly 16 as seen in FIGS. 1 and 3 is mounted on the projecting end of each of the output drive shafts 151 of the drive motors 150. Each wheel and tire assembly 16 includes a hub assembly 170 onto which is mounted a conventional rim 171 which in turn mounts an off-the-road rubber tire 172. The hub assembly 170 is attached to the inside outer edge of the rim 171 and includes a circular support plate 174 which is attached to the rim and extends inwardly therefrom. A central opening 175 is provided through the plate 174 and into which is mounted a hub 176 which is welded to the plate 174 about the opening 175. The hub 176 is received on the drive shaft 151 to support the wheel and tire assembly 16 so that the support plate 174 is generally normal to the drive axis $A_D$ extending through the drive shaft 151. This supports the wheel and tire assembly 16 so that the rim 171 and tire 172 extend back over and around the spacer ring 40. A hub nut 186 is provided which threadedly engages the threaded end of the drive shaft 151 to force the hub 176 onto the tapered support portion 164 to mount the wheel and tire assembly 16 on the shaft 151.

I claim:
1. A modular vehicle subassembly comprising:
a base frame including a pair of spaced apart tubular side rails, each of said side rails having spaced apart inside and outside walls, and defining a prime mover enclosure, a first space, and a second space therein, said base frame further including a pair of spaced apart and opposed slide rails mounted on said side rails within said enclosure;
a prime mover module including an undercarriage movably supporting said module on said slide rails within said enclosure;
a first fluid tank removably mounted in said first space;
a second fluid tank removably mounted in said second space, and connected to said prime mover module;
locating means for selectively and releasably fixing said prime mover module in said enclosure;
fluid motor means carried by said base frame outside of said side rails adjacent said outside walls;
fluid pump means having an output connected to and driven by said prime mover module, said fluid pump means operatively connected to said first fluid tank;
a first coupling inside of said inside wall of one of said side rails;
a first opening defined through said inside wall of said one of said side rails in registration with said first coupling;
a second coupling between said inside and said outside walls of said one of said side rails releasably engaging said first coupling through said first opening;
a second opening through said outside wall of said one of said side rails at said fluid motor means;
first means operatively connecting said fluid motor means with said second coupling through said second opening and between said outside and inside walls of said one of said side rails; and,
second means operatively connecting said first coupling with the output of said fluid pump means to power said fluid motor means.
2. The modular vehicle subassembly of claim 1 further including a third coupling inside of said inside wall of the other of said side rails; a third opening defined through said inside wall of said other of said side rails in registration with said third coupling; a fourth coupling between said inside and said outside walls of said other of said side rails releasably engaging said third coupling through said third opening; a fourth opening through said outside wall of said other of said side rails at said fluid motor means; third means operatively connecting said fluid motor means with said fourth couplings through said fourth opening and between said outside and inside walls of said other of said side rails; and, fourth means operatively connecting said third coupling with the output of said fluid pump means to power said fluid motor means.

* * * * *